United States Patent [19]

Kyrazis

[11] Patent Number: 5,666,202
[45] Date of Patent: Sep. 9, 1997

[54] HIGH BANDWIDTH, DYNAMICALLY RIGID METROLOGY SYSTEM FOR THE MEASUREMENT AND CONTROL OF INTELLIGENT MANUFACTURING PROCESSES

[76] Inventor: Demos Kyrazis, 1028 Tramway La., NE., Albuquerque, N. Mex. 87122

[21] Appl. No.: 518,106

[22] Filed: Aug. 22, 1995

[51] Int. Cl.$^6$ ................................................. G01B 11/14
[52] U.S. Cl. ........................................ 356/375; 250/559.29
[58] Field of Search ................................... 356/372, 375, 356/307, 376; 250/222, 222.1, 561; 395/89, 93, 94; 364/571.01

[56] References Cited

U.S. PATENT DOCUMENTS

| | | | |
|---|---|---|---|
| 3,888,362 | 6/1975 | Fletcher et al. | 214/1 B |
| 4,453,085 | 6/1984 | Pryor | 250/203 R |
| 4,473,276 | 9/1984 | David, Jr. et al. | 350/358 |
| 4,482,960 | 11/1984 | Pryor | 364/424 |
| 4,523,100 | 6/1985 | Payne | 250/561 |
| 4,602,163 | 7/1986 | Pryor | 250/561 |
| 4,637,725 | 1/1987 | Stefanov et al. | 356/354 |
| 4,788,440 | 11/1988 | Pryor | 250/561 |
| 4,831,233 | 5/1989 | Gordon | 219/124.34 |
| 4,890,921 | 1/1990 | Pond et al. | 356/349 |
| 4,942,539 | 7/1990 | McGee et al. | 364/513 |
| 4,969,107 | 11/1990 | Mizutani | 364/513 |
| 5,177,563 | 1/1993 | Everett et al. | 356/375 |
| 5,180,881 | 1/1993 | Wootton et al. | 89/41.19 |
| 5,273,236 | 12/1993 | Wootton et al. | 244/3.11 |
| 5,280,436 | 1/1994 | Kubota et al. | 364/559 |
| 5,321,353 | 6/1994 | Furness | 318/568.11 |
| 5,506,682 | 4/1996 | Pryor | 356/375 |

OTHER PUBLICATIONS

Kelly, Brian O. and Nemhauser, Robert I.; *Techniques for Using the Position Sensitivity of Silicon Photodectors to Provide Remote Machine Control*; 21st Annual IEEE Machine Tool Conference, Hartford Conn.; Oct., 1973, pp. 1–7.

*Primary Examiner*—Frank G. Font
*Assistant Examiner*—Michael P. Stafira
*Attorney, Agent, or Firm*—Oppenheimer Poms Smith

[57] ABSTRACT

A high bandwidth, dynamically rigid metrology system for providing real time control of an optical steering element includes a pair of stabilized laser beam directors (SLBD), a reference subsystem, a tool sensor subsystem, and at least one processor. Each SLBD includes a base, a beam pointing and stabilization apparatus mechanically coupled to the base, three reference beam lasers and a stabilized beam laser attached to the base, and a metric structure which is mechanically coupled to the SLBD providing a locally rigid SLBD coordinate system. Each beam pointing and stabilization apparatus includes an optical steering element and an axis tilt detector. The optical steering element is optically coupled to the stabilized beam laser and steers the stabilized beam laser in response to an input signal. The optical steering element provides error signals associated with a position and an orientation of the optical steering element relative to the locally rigid SLBD coordinate system. The optical steering element further includes a rotational axis. The axis tilt detector provides signals indicating an angle of tilt and a direction of the rotational axis relative to an initial position of the rotational axis. The reference subsystem includes three reference detectors fixedly positioned relative to a workpiece providing a locally rigid workpiece coordinate system. The three referenced detectors are respectively in optical communication with the three reference beam lasers of each of the SLBDs. The reference detectors generate reference detector output signals in response to the reference beam lasers. The tool sensor subsystem includes at least one tool sensor detector positioned on a tool and in optical communication with the stabilized beam laser. The at least one tool sensor detector generates tool sensor detector output signals in response to the stabilized beam laser. The at least one processor receives and performs coordinate transforms on the referenced detector output signals and the tool sensor detector output signals to track a position of the tool relative to the locally rigid workpiece coordinate system. The at least one processor additionally receives and processes the angle of tilt and direction signals from the axis tilt detector and the error signals from the optical steering element to generate the input signal thereby providing real time control of the optical steering elements.

20 Claims, 5 Drawing Sheets

HIGH BANDWIDTH, DYNAMICALLY RIGID METROLOGY SYSTEM FOR THE MEASUREMENT AND CONTROL OF INTELLIGENT MANUFACTURING PROCESSES

BACKGROUND OF THE INVENTION

1. Field of the Invention

This disclosure describes a high bandwidth, dynamically rigid metrology system (DRMS) for the measurement and control of industrial processes. The phrase "dynamically rigid system" is defined to mean one which establishes a fixed coordinate system in space that, from a functional standpoint, is rigidly attached to a "workpiece" without the need for massive, stiff structures to maintain rigidity. The coordinate system is established by optical means, and the optical devices used in this system have sufficient bandwidth so as to counter the effects of vibration and relative motion between the metrology system and the workpiece. By maintaining a fixed relationship in space between dynamically stabilized laser beams and the workpiece, the functional equivalent of rigidity is attained.

A major feature of this invention is that it can attain very high accuracies in an economical manner by utilizing off the shelf industrial components, often in innovative ways not originally envisioned by the manufacturer. Therefore, the costs for obtaining high performance are reduced substantially, often to one percent or less of the cost associated with the current state of the art.

In some cases, there are relatively large errors associated with certain classes of industrial components, and these cannot be reduced to acceptable tolerances regardless of cost. The environment in which this invention is used also induces errors in positioning, and these errors must be measured. An integral part of this invention is the means of measuring these errors, and correcting them. Substantial computational power such as that provided by workstations or high end personal computers is required to execute the high speed mathematical operations used to compute corrections in real time. In addition, reduced noise optical sensors and improved light sources enable low-cost, precision sensing and tracking.

2. Description of the Related Art
COMPETING APPROACHES

Metrology approaches can be classified as either direct or indirect. A direct measurement is made, for example, by measuring the position of a point with respect to some reference with a tape measure. An example Of the indirect measurement approach is a stereoscopic vision system where the distance measurement is made by triangulation. The quantities actually measured are the distance between two cameras and the registration of the images on the focal plane. The dynamically rigid metrology system (DRMS) of the present invention is an indirect measure method. Table I illustrates the competing technologies with DRMS.

Direct Position Measurements-Interferometer

An extremely accurate, commercially available direct method of measuring length is a laser interferometer which is thousands of times more accurate for measuring distance along a beam than the capability of DRMS. The National Institute of Standards and Technology (NIST) has reported the use of a laser interferometry system to dynamically track the position of a robot end effector. In addition to the laser beam, the system uses rotating mirrors to track the beam onto the robot and reflect it back to the interferometer. In this way, a distance and two angles give the spherical coordinates of a point with respect to the coordinate system attached to the measuring instrument. This is a laboratory system and its stated is 0.0005 inches within a 3-meter cube as a result of mirror induced errors.

TABLE I

| Comparison of Approaches | | | |
|---|---|---|---|
| | PRECISE | LARGE VOLUME | HIGH BANDWIDTH |
| DIRECT | | | |
| Interferometer | x | | |
| NIST Device | x | x | |
| INDIRECT | | | |
| Theodolite | x | x | |
| Optical Imaging | x | x | |
| DRMS | x | x | x |

The interferometer system has a number of limitations. The mirrors used in this system are galvanometer driven mirrors, and as a result of bearing tolerances, the axis of rotation wobbles as the mirror rotates. This wobble component is of the order of 5 microradians (approximately 1 arc second), which results in increasingly larger error as the measuring volume increases. To obtain high bandwidth, the mirrors must be relatively small (approximately 2 cm diameter), which precludes the use of the large diameter beams needed for high resolution over large distances.

In addition to the mechanical problems of rotating mirrors, the interferometer can only measure changes in distance by counting the interference fringes resulting from that change. Consequently, any interruption of the beam requires re-establishing a reference point, since the fringe count will have been lost by the interruption. The maximum velocity component that an object can have along the direction of the interferometer beam is limited to 28 inches per second for commercially available interferometers. This speed is much slower than many machines move.

The interferometer based system has high accuracy within a reasonably large volume, requires global rigidity in order to function, and has limited velocity tracking capability. However, due to the beam interruption problem, its primary use is in the laboratory or as a calibration device for other metrology systems to be used in the production environment.

Direct Position Measurement-Theodolite

Commercially available direct position measurement-theodolite instruments (i.e., Sokkia SETBii Electronic Total Station) work on a principle similar to the previously described device. Such an instrument basically consists of a theodolite to which a laser range finder has been added. The theodolite provides the two angular coordinates, and the laser provides the distance coordinate. This instrument is much slower than the NIST device and far less accurate because of the laser range finder. The laser range finder has a resolution of 0.0065 inches which implies a time resolution of $10^{-11}$ second. In contrast, to obtain the distance resolution of the NIST device requires a time resolution of $4 \times 10^{-14}$ seconds which is now only possible under certain laboratory conditions.

Indirect Position Measurements-Theodolite

The prototypical indirect method of measuring position is in land surveying through triangulation. All other indirect methods must contain the same elements, and an understanding of the DRMS is aided by analogy to surveying. In the surveying problem, triangulation requires a carefully measured distance as a baseline, and a reference plane determined by the intersection of the baseline and the local vertical as established by the gravity vector. The vector normal to the reference plane, with the local vertical and the baseline, establish three coordinate axes from which measurements can be made. The theodolite(s) is used to measure the azimuth and elevation angles from each end of the baseline to the point in question. This information is sufficient to solve for the other sides and angle of the triangle, as well as its orientation. In the surveying problem, mathematical equations are used to transform to standard coordinates such as latitude and longitude.

Surveyor's theodolites have been used to statically calibrate robot end effector position. This is one of the more accurate indirect methods of making the measurement, but is extremely slow since this requires manual operation and repeated readings.

Indirect Position Measurements-Optical Imaging

A stereoscopic vision system consisting of two (or more) fixed video cameras can make the same measurement at a faster rate by processing the image and determining where in each focal plane fixed features of the observed scene are located. Such a system is advantageous in that the workpiece and the tool can both be seen at the same time. The bandwidth of this type of system is limited by the video frame rate of 30 frames per second, which establishes a Nyquist frequency of 15 Hz. When one takes into account the computationally intensive image processing time, bandwidths are reduced even more, with realistic bandwidths reduced to 5 Hz or less.

A commercially available system that performs the equivalent function of the stereoscopic system is called "Optotrak." This commercially available system avoids the image processing time penalty by using point sources of light (light emitting diodes) mounted on the objects whose positions are to be measured. The sources of light are observed by three linear charge coupled devices (CCD) arrays rigidly mounted on a 1.1-meter sensor bar. Each light source is turned on sequentially, so that the CCD's see one source at a time. In this way, no processing is needed to determine the identity of the point in space. The manufacturer claims up to a 600 Hz positional data rate for this system which results in a Nyquist frequency of 300 Hz. At best, this system would provide a closed loop control bandwidth of 15 to 30 Hz. The claimed accuracy of the system at a distance of 6 meters (19.7 feet) from the sensor bar is approximately 0.039 inch based on taking the root sum of the squares of the individual errors for each coordinate direction. The field of view at that distance is 2.60×3.54 meters (8.53 ×11.32 feet), comparable to one face of the cube that the previously described NIST system measures to an accuracy of 0.0005 inch. Even at a shorter distance of only 2.25 meters (7.38 ft.) with a reduced field of view of 1.34×1.26 meters (4.4×4.2 feet), the error is approximately 0.008 inch.

Fundamental Limitations of Optical Imaging Systems

A fundamental limitation that must be faced by all indirect, optical metrology systems and which must be accounted for in any application is the effect of beam spreading due to diffraction. Whether one considers projection and focusing of a beam onto a target, or the smallest element that can be resolved by a vision system, they both are limited by the laws of diffraction. Basically, the diameter d of the smallest spot that can be resolved by an optical system is given approximately by twice the product of the range R and the wavelength of light $\lambda$ divided by the diameter of the beam projection lens D; i.e., $$d = 2.44 \frac{R\lambda}{D} \quad (1.1)$$

For example, a 2-inch diameter lens focused on an object 1 meter away will only be able to resolve 0.001 inch when the object is viewed by the red light of a helium-neon laser (0.63 $\mu$m).

A differentiation can be made between a resolution element as determined by the diffraction limited spot size (Equation 1.1) and the resolution as determined by the pixels in a CCD array. If the diffraction spot is smaller than a pixel, then the pixel size determines resolution. If the diffraction spot covers several pixels, then there are image processing techniques that allow one to determine the position of a high contrast object to less than a diffraction spot size. One can see that for a specified resolution, the field of view of the optical system is limited by the total number of pixels available on the focal plane detector. CCD arrays, for example, are discrete devices in which each pixel is an individual detector mounted on a substrate. The total number of pixels along one direction range is from a few hundred to two thousand. Ultimately, the trade-off is between: (1) a limited field of view, with high resolution, and large optics; and (2) a large field of view, with low resolution, and small optics.

The limitations imposed by diffraction effects necessitate mechanical movement of the optical system if a combination of high resolution and a large field of regard is desired. However, the movement of a relatively large optical system introduces a new set of problems which gives rise to conflicting requirements. For example, the movement of a relatively heavy set of components at high speed conflicts with positioning them to microradian accuracies because the large bearings needed to take the loads will introduce large amounts of rotation axis wobble, etc. An examination of existing systems and the components available leads to the conclusion that the designers of these systems have. already made substantial progress in bringing the system performance close to physical and manufacturing limits. Improvements can be made, but it is unlikely that current approaches will lead to truly significant performance increases.

In the vast majority of manufacturing operations, the position of a tool with respect to the workpiece is determined indirectly. For example, when using a milling machine, the workpiece is attached to the table. The table, through the ways, is attached to the saddle, which is then attached to the knee and column of the machine. The overarm extends from the column and supports the tool (cutter). In this situation, setup time is associated with positioning the workpiece with respect to the tool. In the machining operation, the bed moves the workpiece and the position of the bed is measured. Desired information is the position of the tool with respect to the workpiece. In order for this indirect method to work, the machine must be built to be extremely rigid. This indirect method of determining the position of the tool with respect to the workpiece is known as an open loop control system.

In contrast, the structure of a human being is very flexible, yet a person can thread a needle. The difference lies in the type of control system used by people. Human vision can determine the position of the needle (the workpiece) and the position of the thread (the tool). The difference between the two positions provides the information needed to control the arms to finally thread the needle. If the eyes are closed, the needle cannot be threaded. This generally illustrates the advantage of using a closed loop control system.

The concept of dynamic rigidity is illustrated by the following example. By providing feedback through the incorporation of vision, even an unsteady motion of the hand holding the needle can be compensated by moving the other hand to maintain a fixed relationship between the needle and the thread. In mathematical terms, a coordinate system is fixed to the workpiece and a fixed position for the tool in that coordinate system is dynamically maintained, i.e., the closed loop system can be made dynamically rigid.

The tremendous advantage conferred by a closed loop control system is well known, and considerable research has been expended in developing vision systems and other means of providing feedback. A major disadvantage of vision systems is that they are computationally intensive and very slow. The maximum closed loop bandwidth of such systems is generally less than two Hz.

In order to meet the promise inherent in closed loop control for large scale manufacturing processes, the metrology system must simultaneously provide 1) high speed, 2) high accuracy, and 3) large operating volume. Presently available systems can meet one, and perhaps two, of the three requirements. Nothing available in the current state of the art can meet all three requirements.

It is the purpose of this invention to meet all three requirements, and thereby establish a new enabling technology for industrial processes, such as control of flexible structures and intelligent manufacturing processes. Specifically, the DRMS of the present invention is 20 to 150 times faster than industrial systems employing the current state of the art, and obtains a closed loop control bandwidth of 300 Hz or higher. For the purpose of this invention, the term "large operating volume" is defined to mean a cube 15 feet (~4.6 meters) on edge and the term "high accuracy" is defined to mean that each point is designated to an accuracy of 0.001 inches (25.4 μm) within the volume. For a larger volume such as a cube 100 feet (~30 meters) on edge, the accuracy is reduced to 0.002 through 0.020 inches based on application and bandwidth requirements. The system is capable of tracking and controlling a tool while it is moving at speeds exceeding 25 feet per second. In order to measure the position of a point in space, a coordinate system must first be established. Conventionally, three elements (workpiece, tool and measuring device) are rigidly attached to this coordinate system. Typically, rigidity is obtained by the use of very stiff and often massive structures to provide isolation from motion imposed by external sources, and to fix the relative positions of the three elements. The foregoing approach is hereinafter referred to as establishing a "global rigidity."

Almost all tool positioning and metrology methods rely upon global rigidity. For example, the links on a robot and the floor connecting the robot's pedestal to the workpiece provide the elements making up a globally rigid system. A large coordinate measuring machine holding the workpiece rigidly to its frame is another example. Methods for determining the coordinates of a point can be direct, such as using a tape measure, or indirect, such as the triangulation methods used by surveyors.

As the work volume increases, the maintenance of global rigidity becomes increasingly difficult until the point is reached where it is no longer possible to maintain rigidity by mechanical means. Several factors contribute to the lack of rigidity of very large structures. The first is related to scale. Deflections over a short distance that result from the elasticity of materials are often imperceptible. As the structure increases in scale, the same proportional deflection becomes much larger on an absolute scale, and then exceeds acceptable limits. A second problem has to do with the mass of the structure as the scale increases. The increase in volume, and thus the mass, is proportional to the third power of the scale change, while the cross-sectional area increases with the square. Eventually, a point is reached where the structure can no longer support itself. Accordingly, an object of the present invention is to provide a coordinate system in space which is rigidly attached to the workpiece from which high speed, closed loop control of industrial machines and other processes can be implemented. For example, in order to machine a very large item such as an aircraft wing section, a massive machine is needed to maintain structural rigidity. The machine must be anchored to a stable base such as a large concrete pad the size of a swimming pool. As a result, the workpiece must be brought to the machine with the associated loss of time due to set up and transportation. With the closed loop control made possible by the DRMS, the workpiece can remain fixed so that light weight machines can be brought to the workplace and immediately be established in the workpiece coordinate system. The flexible approach provided by the DRMS accommodates rapid changes in the production process brought about by engineering improvements or by product change.

Closed loop feedback will dramatically change the application of robots. Currently, a robot maintains its precision by the use of massive structures. Current technology requires that the weight of a robot be about 25 to 40 times greater than the payload it must carry. By the use of closed loop control, the robot's weight to payload ratio can be reduced significantly to as low as two to one. Such capability results in a much more efficient production line that can be changed quickly for new products and which can be directly controlled by software.

The following goals and objects are additionally provided by the DRMS:

1) Establish a workpiece fixed coordinate system in a large volume of space with high accuracy. This coordinate system must be referenced to the object being processed (the workpiece). For the DRMS invention, we define a large volume as a cube 15 feet (4.6 meters) on edge, in which each point within that volume is designated to an accuracy of 0.001 inch.

2) Provide a large field of regard to sequentially control several tools or robots in the work space.

3) Accommodate a very high bandwidth so that it can both control a tool and negate the effects of vibration in the workplace. In this context, we specify a 300 Hz closed-loop control bandwidth, which implies a data channel sampling rate of 5 kHz. This high bandwidth is needed for the dual purpose of controlling light-weight, fast-moving machinery, and of providing vibration isolation from the environment.

4) Be portable and not require a rigid structure between it and the workpiece.

5) Have an acceptable acquisition cost and a low life cycle cost.

The combination of high speed, high accuracy, and large volume capability embodied in the DRMS facilitates a wide range of improvements in manufacturing and additionally enables the development of a new class of. machinery and robot.

SUMMARY OF THE INVENTION

In accordance with a specific illustrative embodiment of the present invention, a control system for an optical steering element in a high bandwidth dynamically rigid metrology system includes a pair of stabilized laser beam directors (SLBD) each within a locally rigid SLBD coordinate system, a reference subsystem providing a locally rigid workpiece coordinate system, and a processor. Each of the SLBDs includes an optical steering element and an axis tilt detector. Each of the optical steering elements steers a stabilized beam laser in response to an input signal. The optical steering elements of each SLBD include a rotational axis and output error signals associated with a position and orientation of the optical steering element relative to its locally rigid SLBD coordinate system. The axis tilt detector of each SLBD provides signals indicating an angle of tilt and a direction of the rotational axis relative to an initial position of the rotational axis. The reference subsystem outputs signals indicating positions of the SLBDs relative to the referenced subsystem. The processor processes the signals from the reference subsystem relating the locally rigid SLBD coordinate systems to each other and to the locally rigid workpiece coordinate system. The processor additionally processes the error signals from the optical steering elements and the angle of tilt and direction signals to generate the input signal for steering the stabilized beam laser in real time.

In a further aspect of the present invention, a high bandwidth, dynamically rigid metrology system for providing real time control of an optical steering element includes a pair of stabilized laser beam directors (SLBD), a reference subsystem, a tool sensor subsystem, and at least one processor. Each SLBD includes a base, a beam pointing and stabilization apparatus mechanically coupled to the base, three reference beam lasers and a stabilized beam laser attached to the base, and a metric structure which is mechanically coupled to the SLBD providing a locally rigid SLBD coordinate system. Each beam pointing and stabilization apparatus includes an optical steering element and an axis tilt detector. The optical steering element is optically coupled to the stabilized beam laser and steers the stabilized beam laser in response to an input signal. The optical steering element provides error signals associated with a position and an orientation of the optical steering element relative to the locally rigid SLBD coordinate system. The optical steering element further includes a rotational axis. The axis tilt detector provides signals indicating an angle of tilt and a direction of the rotational axis relative to an initial position of the rotational axis. The reference subsystem includes three reference detectors fixedly positioned relative to a workpiece providing a locally rigid workpiece coordinate system. The three referenced detectors are respectively in optical communication with the three reference beam lasers of each of the SLBDs. The reference detectors generate reference detector output signals in response to the reference beam lasers. The tool sensor subsystem includes at least one tool sensor detector positioned on a tool and in optical communication with the stabilized beam laser. The at least one tool sensor detector generates tool sensor detector output signals in response to the stabilized beam laser. The at least one processor receives and performs coordinate transforms on the referenced detector output signals and the tool sensor detector output signals to track a position of the tool relative to the locally rigid workpiece coordinate system. The at least one processor additionally receives and processes the angle of tilt and direction signals from the axis tilt detector and the error signals from the optical steering element to generate the input signal thereby providing real time control of the optical steering elements.

THE DRMS APPROACH

The forgoing discussion of a metrology system based on indirect position measurement of position illustrated how the laws of physics and the limitations of optical/mechanical components impose constraints on the performance of such systems. The maintenance of microradian class pointing and alignments between two objects separated by only a few meters across a room is a daunting task in view of the "flexibility" of most environments. In one experiment, an attempt to maintain a 1 μradian alignment of a fixed beam across a basement laboratory with a concrete floor was unsuccessful. The beam was thrown out of alignment simply by the laboratory workers standing in different places in the room. The problem was solved by marking each place on the floor where each person stood during a measurement. For large production line machines, it may be necessary to dig a hole as large as a swimming pool, and fill it with concrete in order to obtain the needed rigidity. The cost of establishing a rigid base is often as great as the cost of the production machine. The need for mechanical rigidity also has a long term cost in inefficiency. As production needs change, the machine cannot be moved to optimize the production process.

The basic principles upon which the present invention is based are set forth below. The term "workpiece" includes the item being manufactured and any cradles or jigs used to support the item being manufactured.

1) Global rigidity is impossible over large distances, therefore it is desirable to design a system in such a way that global rigidity is not needed.

2) The workpiece establishes the coordinate system which leads to the concept of local rigidity associated with the workpiece.

3) All other parts of the system track the work-piece, and the displacements/rotations of other system components are treated as offsets from the workpiece based, locally rigid coordinate system.

4) Appropriate local references are built into the system so that local deviations from ideal are detected and actively corrected.

5) Where possible, a single subsystem should not, but may, be designed to operate over the full frequency band. Large motions, for example, are usually low frequency. High frequency motions require high accelerations, but have small amplitudes.

6) The system is assembled from components in volume production, possibly using the components in ways never intended by the manufacturer.

Principles of a Dynamically Rigid Metrology System.

Figure 1:
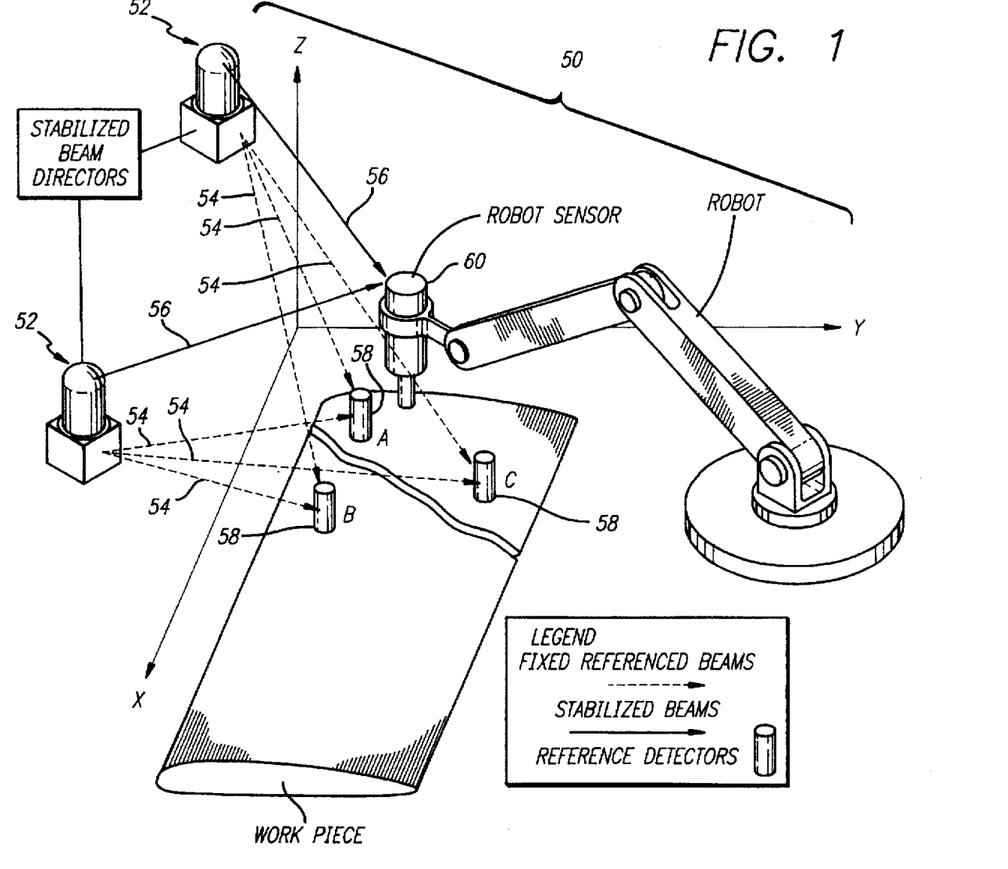
FIG. 1 is a perspective view of the DRMS and a workpiece.

FIG. 1 shows the workpiece, two stabilized laser beam directors (SLBD) which are located just outside the work volume and a robot. The DRMS which controls the robot normally consists of two SLBDs, three or more reference detector assemblies, a tool sensor, calibration and setup tools, and associated software. As used here, the term "workpiece" includes the item being manufactured and any cradles or jigs used to support the item being manufactured. Three reference detector assemblies designated A, B, and C are positioned on the workpiece. Two vectors, one drawn from A to B, and the other from A to C, define two of the basis vectors for the coordinate system. The third vector is determined by the vector normal to the plane defined by the previous two vectors. The only mechanical rigidity required is that associated with the workpiece. The two independent baselines establish a metric for the coordinate system to be associated with the workpiece and an orientation with respect to the workpiece. Since orientation is not associated with the gravity vector, the same system can be used for metrology in space.

The SLBDs each project four laser beams. Three of the beams, called the reference beams, are fixed with respect to the body of the SLBD, and are projected onto the reference detector assemblies. The fourth beam, called the stabilized beam, can be directed in azimuth and elevation to establish a line of sight through the desired point in space. Each reference detector assembly consists of one or more photo detector which can measure the position of the reference beams on the detector surface to accuracies of 10 microinches. The location of the three fixed beams on the reference detectors then provides information concerning the position and orientation of the SLBD with respect to the workpiece. Relative motion, both in translation and rotation, between the SLBD and the workpiece is continually measured to provide real-time azimuth and elevation corrections to the stabilized beam, thereby maintaining the line of sight through the designated point in the workpiece coordinate system.

The need for global rigidity is eliminated by continually measuring the position and orientation of the SLBDs with respect to the workpiece. Thus the first principle is satisfied by establishing a virtual baseline between the SLBDS. The three reference detector assemblies on the workpiece establish the coordinate system, thereby satisfying the second principle of local rigidity. Finally, the third principle is satisfied by dynamically offsetting the stabilized beams from the workpiece to continuously establish the point of intersection with respect to the workpiece. The fourth through sixth principles will be illustrated as we discuss the detailed embodiment of the SLBDS.

We separate the large, low-frequency angular excursions from the small, high-frequency angular deviations by using the equivalent of two gimbals for each rotational axis. The gimbal producing the large field of regard will be referred to as the large angle driver. The equivalent of the second gimbal will be referred to as the high speed beam deflector, and it produces the high bandwidth, limited field-of-view angular deflection of the stabilized laser beam. The large angle driver mechanically rotates to bring the desired point in space within the field of view of the high speed beam deflector. An incremental optical encoder is used to accurately determine where the large angle driver is pointing. Some manufacturers of encoders use the identical manufacturing process for both their incremental encoder disks and for large absolute angular encoders. Hence, the edge transition of each step in the incremental encoder is known to sub-microradian accuracy. It is also possible to obtain a sinusoidal electrical signal from the encoder, such that the zero crossing of the sinusoid corresponds precisely to the edge transition.

In operating the large angle driver, a DC servo motor is used to position the mechanical assembly at a designated zero crossing. There will be some error in the positioning, and the servo system will continually hunt about the zero crossing. For angles close to the edge transition, the electrical output of the encoder is a linear function of angle. In this way an error signal is produced that can be used to drive the high speed beam deflector, and correct for the motion of the random motion of the large angle driver. Commercially available incremental encoders can divide a circle into 618.4 µradians steps with sub-microradian accuracy.

The high speed beam deflectors are made up of two Bragg cells (acousto-optical deflectors), one for each axis of rotation. The preferred Bragg cells can deflect a beam over a 5.231 milliradian range and contain no moving parts. The frequency response of the Bragg cell is in the megahertz range and can easily compensate for any possible mechanical motion. The deflection of a beam passing through the cell is controlled by the frequency of an ultrasonic wave propagating within a transparent solid. In effect, the acoustic wave generates a diffraction grating within the solid, and the beam deflection angle becomes a function of the wavelength of the light beam and of the grating spacing as established by the acoustic wave. By changing the frequency of the acoustic wave, the deflection angle of the beam is changed.

By using a Bragg cell, a difficult mechanical measurement of angle is transformed to a much simpler measurement of frequency. Bragg cells are commercial production items used in a wide variety of applications such as laser modulators and laser beam deflectors (Isomet model 1205C-2).

A key principle and advantageous feature of the present invention is the accurate measurement of errors from less precise industrial grade components, and correcting those errors through computation and control of the stabilized beam. As alluded to earlier, one of the error sources is the wobble of the rotational axis of any mechanical system rotating on bearings. Although an air bearing would solve the axis wobble problem directly, it is neither a low cost or easily implemented solution for all applications. According to the present invention, a means is provided for measuring the tilt of the axis as rotation occurs, and the measured tilt information is used to control the frequencies driving the two Bragg cells, thereby changing the azimuth and elevation of the stabilized beam so as to correct for the axis tilt.

Even the use of ABEC Class 9 (the most precise class available) mechanical bearings will result in a 25 microradian wobble in this application. Therefore, cost savings may be achieved by using readily available, less precise bearings such as ABEC Class 5. A measurement of axis tilt is made and then corrected by feeding the error signal to the inner gimbals.

Figure 5:
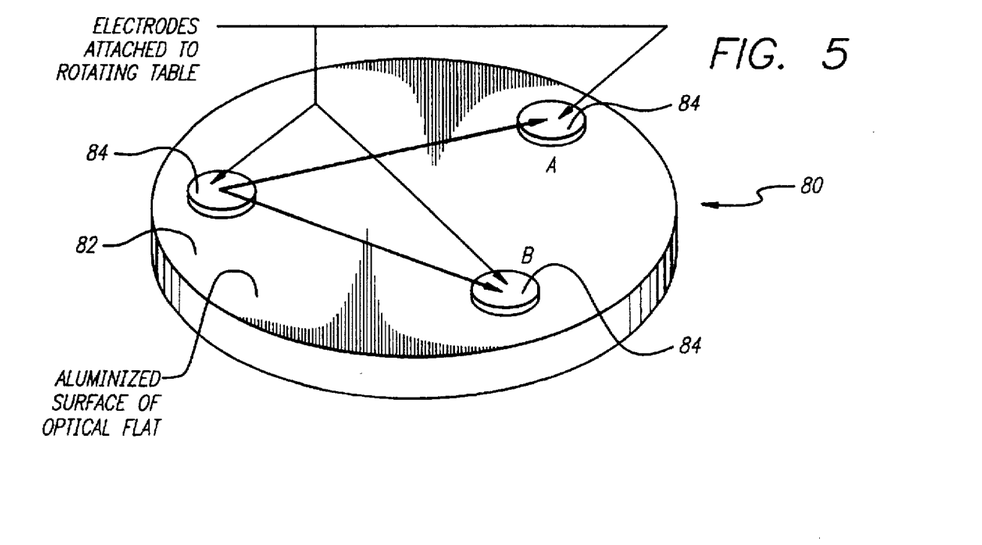
FIG. 5 is a perspective view of the reference plane of the DRMS.

As shown in FIG. 5, an optical flat may be used as a reference plane to measure tilt in real time. The surface of the flat is coated with aluminum, and such an item is normally sold as a mirror. The surface of the mirror is flat to one twentieth the wavelength of light (1.25 microinches) and makes an extremely precise reference plane. Attached to the rotating part of the system are three conducting probes about one half inch in diameter, and these are spaced a few thousands of an inch from the mirror surface. The three probes establish a plane fixed to the rotating part of the outer gimbal. The mirror is one plate of an electrical capacitor, and each probe is the other plate. The distance of each probe from the mirror surface can be determined by measuring the capacitance between the probe and the mirror.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

SUBSYSTEMS

A preferred embodiment of the DRMS consists of five major subsystems:

1. the stabilized laser beam director (SLBD);
2. the workpiece reference subsystem;
3. the tool sensor subsystem;
4. the calibration subsystem; and
5. the computational subsystem.

It should be appreciated that embodiments of DRMS can be application specific. The embodiment given in this disclosure meets the majority of applications requiring large volume, high speed, precise metrology, and provides the control bandwidth for closed loop control applications in most industrial environments. Performance trade-offs can be made within the bounds of this disclosure such that one skilled in the art can easily optimize the total system for special applications.

The preferred embodiment described herein is based on a design requirement to point and stabilize two laser beams to an angular accuracy of five microradians with respect to a workpiece. This level of angular accuracy will enable one to designate any point within a cube 15 feet on edge to an accuracy of approximately 0.001 inches. The function of each major subsystem will be described first, in general terms, with more detailed descriptions following thereafter.

STABILIZED LASER BEAM DIRECTOR

A key subsystem of the DRMS 50 is the stabilized laser beam director (SLBD) 52, the use of which is illustrated in FIG. 1. The SLBD 52 provides at least four laser beams which consist of three reference beams 54 and one stabilized beam 56. Once the system is set up, the three reference beams 54 remain fixed and the stabilized beam 56 is directed to a point in space that generally changes with time. The SLBD 52 itself is comprised of several major functional units. These include:

1. beam pointing and stabilization;
2. the base;
3. the metric structure; and
4. the azimuth table.

Beam pointing and Stabilization.

Beam pointing and stabilization encompasses three functions embodied by: (1) the large angle drive; (2) the high speed beam deflector; and (3) the axis tilt detector. These functions are controlled by the computational subsystem in such a way so as to produce the required pointing direction and beam stabilization.

Large angle driver.

The large angle driver allows high speed, precision sluing over a large field of regard including a full 360° circle. A slew rate of 100°/second and accelerations of 100°/sec² are easily attainable and can be exceeded by simply using a higher torque DC servo motor. A conventional state of the art device is the Newport Corporation Model PM500-360R Ultra-precision rotation stage which has an angular resolution of approximately 3 μradians and an absolute accuracy of ±100 μradians. In comparison, the DRMS large angle drive attains accuracies 1,000 to 10,000 times greater, and the total beam stabilization system obtains resolutions 100 times better.

High speed beam deflector.

The high speed beam deflector can have an angular range as large as approximately 50 milliradians (2.87°). Since it consists of an acousto-optical deflector (Bragg cell), it has no moving parts and is capable of frequency bandwidths into the Megahertz regime. In the DRMS application, it can produce angular rates exceeding 10,000°/sec, and beam deflection accuracies of 0.01 μradians.

Axis tilt detector.

The assembly of a rotating mechanical system in which the axis of rotation does not wobble is very difficult. Precision rotating tables typically have an axis wobble ranging from approximately 5 μradians to 20 μradians. A large fraction of the cost of these devices is incurred in producing the necessary mechanical precision to reduce axis wobble to the tolerances stated. The approach used in this disclosure does not require high precision mechanical components to reduce wobble to less than one microradian. The reason is that all tilt is referenced to a high precision optical component which is readily available and has relatively low cost.

Base

The primary function of the base is to provide the necessary mechanical support for the SLBD and provide the means for mounting the SLBD at a desired location. The base provides mechanical support for the heavier components thereby relieving the metric structure of that task. The base also provides the means to keep major sources of heat away from the more critical parts of the SLBD. The major heat sources are the large angle drive servo motor for azimuth and the four lasers used for the stabilize beam and for the three reference beams.

Metric structure

The primary purpose of the metric structure is to provide a rigid, temperature insensitive, mechanical support for the reference beam projectors, the azimuth axis tilt reference plane, and support for the azimuth table. The metric structure provides a local rigidity for the SLBD and ties the reference beams to the stabilized beam.

Azimuth table

The azimuth table is the part of the SLBD that is directly driven by the azimuth servo motor. Mounted on the azimuth table are the large angle driver in elevation and the optical bench. The high speed beam deflectors for both azimuth and elevation are mounted on the optical bench and form a part of the optical system that projects the stabilized beam into the work space.

REFERENCE SUBSYSTEM

The reference subsystem provides a local rigidity at the workpiece. For example, the reference subsystem may consist of three photodetectors mounted on the vertices of a triangle. The photodetectors may be mounted on the workpiece itself, provided that the workpiece is rigid enough. Otherwise, the. photodetectors are mounted on a jig holding the workpiece. Note that if one wishes to measure an object very accurately, the object itself must be sufficiently rigid to maintain a stable dimension that is at least as accurate as the measurement being attempted. The dimensions of a cube of gelatin dessert such as the food article known under the tradename Jell-O cannot be measured to 0.001 inches.

The reference photodetectors selected should be able to resolve extremely small motions of the reference beams, are essentially free from drift, and have a high frequency response. Special precautions have to be taken to minimize or eliminate drift. Methods for doing this are discussed below.

TOOL SENSOR SUBSYSTEM

The specific design of the tool sensor is highly dependent on application. As may be readily appreciated, applications can vary from the one shown in FIG. 1 where a "robot sensor" is used to control the robot, to the direct control of a machine tool used in very large manufacturing processes such as the machining of a wing spar on a large transport category aircraft. Other metrology applications include but are not limited to:

(1) attaching the tool sensor to a probe for measuring the as built configuration of a manufactured product, similar in use to a coordinate measuring machine, but without the high cost and massive structure;

(2) using the tool sensor to determine the location of an electric field probe for calibrating large radar antennas;

(3) measuring the as built configuration of sections of ship hulls, and providing a virtual template for pipe fitting within a ship; and (4) eliminating the need for templates.

Accordingly, diverse applications of the design principles disclosed herein are contemplated as being within the scope of the present invention.

CALIBRATION SUBSYSTEM

The calibration subsystem is used in the initial setup of the DRMS. The calibration subsystem consists of a tetrahedron with a photosensitive detector at each vertex and the necessary communications to interface with the rest of the DRMS system. Employment of the tetrahedron allows the DRMS to be made traceable to National Institute of Standards and Technology length standards. The technique utilized by the calibration subsystem is based on a process known in the surveying profession as tacheometry and is used to determine the exact orientation of each of the SLBDs and the length of the virtual baseline between them.

COMPUTATIONAL SUBSYSTEM

Much of the computational workload in the DRMS consists of high speed signal processing coordinate transformations, and error correcting routines. Much of this type of computation can be accomplished by distributed processing utilizing specialized digital signal processing hardware such as the Motorola DSP56000 series. The utilization of specialized processors allows general purpose computers, such as personal computers and workstations, to be used for executive control of the whole DRMS system and for user interface. An example of the type of calculation amenable to distributed processing is the axis tilt correction used to determine the axis wobble in the SLBD. Furthermore, the nature of the computations permit a hierarchical control structure which allows easy implementation into standard architectures such as the NASA/NBS Standard Reference Model for Telerobot Control System Architecture (NASREM).

STABILIZED LASER BEAM DIRECTOR

The SLBD 52 is now described in greater detail with reference to FIG. 2. A base 10 directly supports a metric structure 20. An azimuth table 30 holds an elevation cylinder support 40 and an elevation tilt reference/elevation encoder support 36.

Base

Within the base 10 are located an azimuth drive DC servo motor 11, an incremental encoder 12 and lasers 13 for the reference and stabilized beams 54, 56. The base 10 itself should be made from aluminum to provide a means of taking away the heat generated by the lasers 13, the DC servo motor 11 and the encoder electronics. The largest moments of inertia are associated with rotation about the azimuth axis, therefore a direct drive shaft 14 to the azimuth table 30 as shown in FIG. 2 is used to transfer the torque from the DC servo motor. The same drive shaft is directly connected to the encoder 12 so as to avoid backlash and other error sources. A wide variety of DC servomotors (i.e., Model BMHS-3501) and their controllers are manufactured by Inland Motors Corp. as well as other manufacturers. The controllers can be purchased to be compatible with the IBM personal computer bus as well as the Apple Computer busses and the VME busses Used on work stations. The controllers accept direct commands from the computers, accept the encoder inputs as well as the encoder error signals and velocity feedback signals, and will apply any acceleration profile commanded by the computer that is within the current drive capability of the servo amplifiers and the torque producing capability of the motor.

In addition to the directly coupled drive discussed above, a speed reducing arrangement can be used to couple between the motor and other parts of the mechanism. Normally, a speed reducer could not be used for this application in which submicroradian accuracy is required. The backlash and cogging normally associated with a speed reducer would be unacceptable and could lead to instabilities in the control system. However, there is a patented device that can be used in this application in which the transfer of torque is both smooth and without backlash. The device is called a "Rotolok" and is manufactured by Sagebrush Technology in Albuquerque, New Mexico.

A device that reduces rotational speed by a factor of N also reduces the dynamic moment of inertia attached to the low speed shaft by a factor of $N^2$. The present invention exploits this fact to reduce the size of am elevation drive motor 31 that is mounted on the azimuth table 30. Since the DC servo motor is the most massive element in the system, a reduction in its size can decrease the moments of inertia significantly. Some applications may have other criteria and the utilization of Rotolok and much smaller servo motors for both drives may be more important than cost. However, the Rotolok does not have to be used with the azimuth drive motor 11 if reduced cost is an important consideration.

Lasers and internal beam transport.

Figure 2:
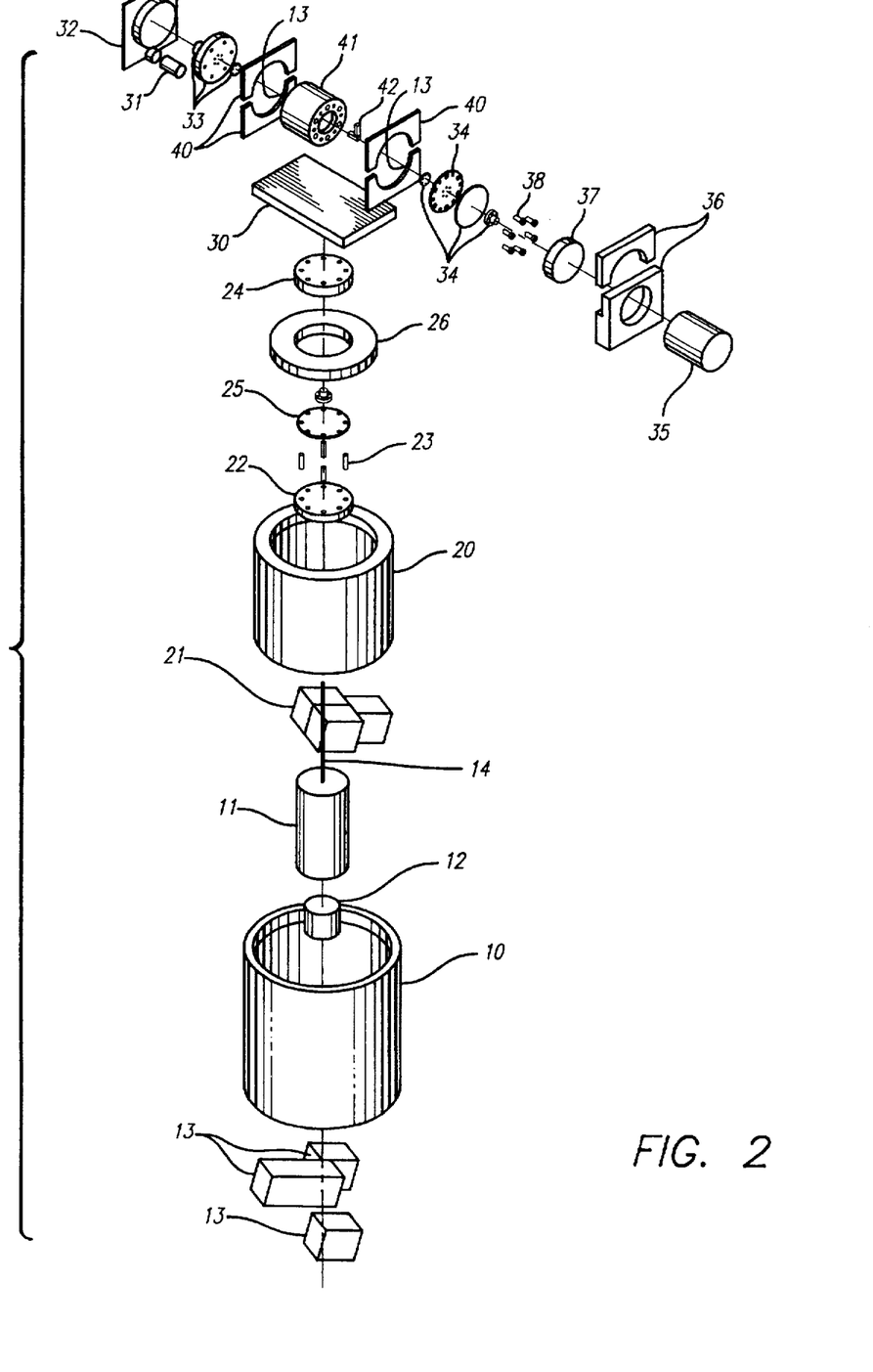
FIG. 2 is an exploded view of the azimuth and elevation drives and support component portions of the DRMS.
Figure 3:
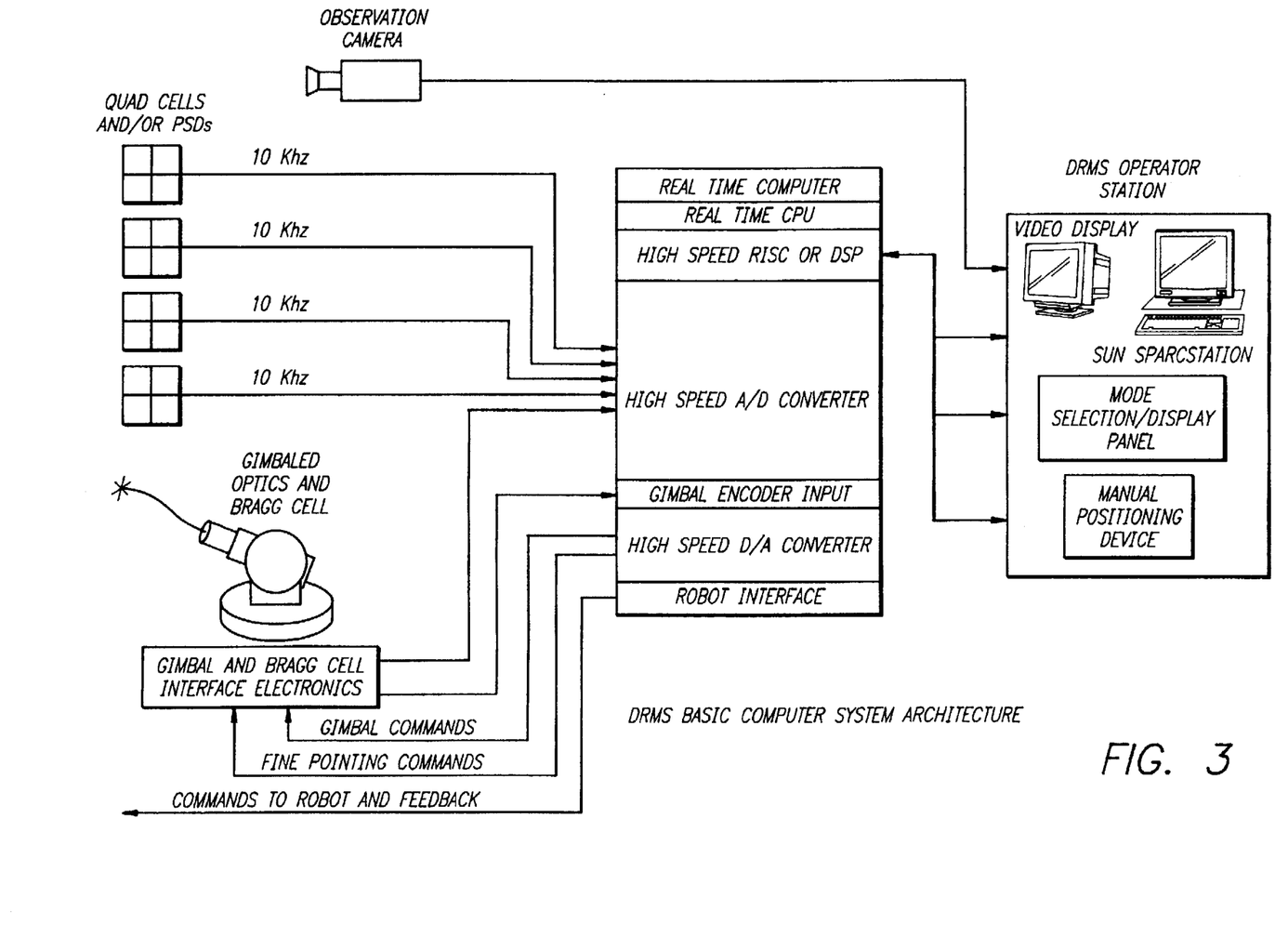
FIG. 3 shows the system architecture of the DRMS.

The lasers 13 shown schematically in FIG. 2 can be of any convenient wavelength. In a preferred embodiment, the lasers 13 comprise solid state diode lasers which are available in both the visible and near infrared wavelengths. The lasers 13 are mounted internally to the body of the SLBD 52 for convenience only, and in practice could be mounted externally. Furthermore, different types of lasers 13 such as a helium-neon laser could be used. It has been observed that control of the laser optical mode is critical. More specifically, the laser should be operated in single mode and in the $TEM_{oo}$ mode independent of the type of laser chosen. If the laser optical mode is not controlled, mode hopping will introduce large, uncontrolled errors which are caused by angular shifts of the optical axis and temporal variations in the beam intensity profile and in the ability to focus the beam. Single mode lasers are commercially available. A preferred single mode diode laser is the Melles Griot model 06DLL107 laser head which not only contains the single mode diode laser, but also includes the built in optics necessary to produce an outgoing beam that is both circular and collimated.

A preferred means of transporting the laser beam to the stabilized beam or the reference beam projectors is with single mode fiber optics. Use of the fiber allows the beam to be routed through the mechanical part of the system without interference. A characteristic of single mode fibers is that they do not change the mode of the propagating beam, an event that often occurs with regular fiber optics when they are bent and routed around obstacles. A preferred commercially available single mode fiber optic for this application is the Spectran Type SMC-AO820B.

Figure 7:
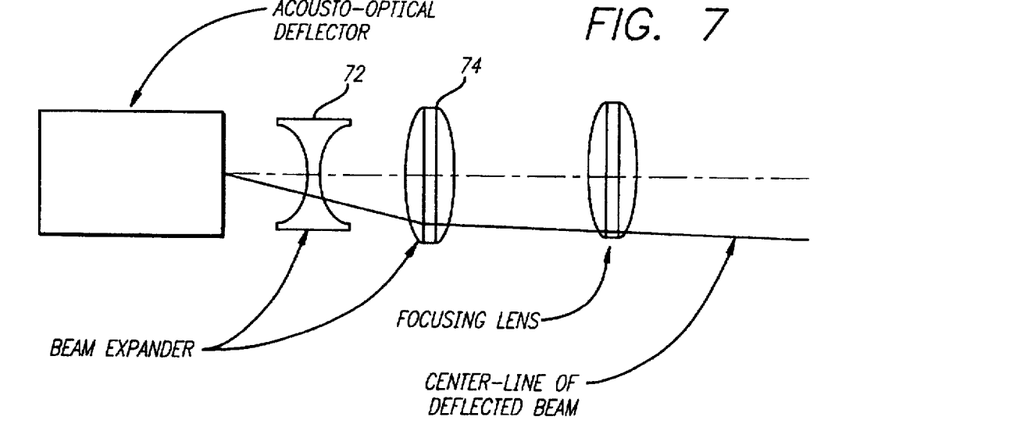
FIG. 7 is a cross-sectional side view the acoustooptical deflector, beam expander and focusing lens.

As shown in FIG. 1, after each of the beams leaves the single mode fiber optic, they are ultimately projected onto reference detectors 58 or onto a tool sensor 60. Before the beams can leave the SLBD 52, they must be expanded from the less than 0.1 mm diameter used internally within the SLBD to the 1 cm or larger diameter needed at the final projection optics in order to have a sufficiently small focal spot at the sensors. Beam expansion can be accomplished either by allowing the normal diffraction spreading of the beam over a long internal propagation path and utilizing a large f-number lens to project the beam. Alternatively and as shown in FIG. 7, a beam expander which consists basically of a negative lens 72 followed by a positive lens 74 can be used. Beam expanders are standard stock items which are available from a number of optical supply vendors. In general, a commercial beam expander is adequate for use with the reference beam projectors, but its use needs to be considered carefully in the projection of the stabilized beam 56. The trade offs between the two methods of beam expansion will be further discussed in the section on the high speed beam deflector. Further discussion of beam propagation issues common to the three reference beams and the stabilized beams is deferred to a later section on optical propagation.

Metric structure

The metric structure 20 integrates the key elements of the SLBD 52 in that it provides the local rigidity needed to bring the reference beams 54 and the stabilized beam 56 to the same local coordinate system. Through the local rigidity in the metric structure 20, the local rigidity in the reference subsystem and the optical coupling between the locally rigid coordinate systems, a global coordinate system attached to the workpiece is established. The details of the metric structure 20 and its major components are discussed below with reference to FIG. 2.

The primary purpose of the metric support structure 20 is to assure that there is no relative motion between an azimuth tilt reference plane 22 and reference beams projection optics 21. The metric support structure 20 and the azimuth tilt reference plane 22 are preferably made of materials with a zero coefficient of thermal expansion. For example, the metric support structure 20 could be manufactured from carbon epoxy composite with the carbon fibers in each layer oriented so as to prevent dimensional changes with temperature change. Another advantage of carbon epoxy is that it is very light, yet has a much higher Young's modulus than steel. In certain environments, it may be more advantageous to use invar instead of carbon epoxy composite. Invar is a steel alloy that also has zero thermal expansion with temperature change. The mirror substrate 22 is preferably made of either cervit or of fused silica, but not glass. The reference beam expanders 21 and their mounting gimbals (not shown) are readily available commercial items and do not require extremely high precision since they remain in a fixed position once they are set up.

The metric structure 20 also provides mechanical support for the azimuth table 30, which is driven by the azimuth servo motor 11 through the azimuth servo motor drive shaft 14. The azimuth table 30 provides the direct mechanical support for the elevation drive system, and provides the large angular coverage in azimuth for the stabilized beam 56.

The position of the azimuth table 30 in terms of angle, translation, and tilt, is not controlled to the same level of accuracy as is required for the overall system. Instead, the errors associated with the position and orientation of the azimuth table with respect to the metric structure are measured extremely accurately, and the necessary corrections are made through the computational subsystem to correct the angle of the stabilized beam 56 so that its optical axis goes through the desired point in space.

The azimuth table 30 is directly attached to an azimuth table drive fixture 24 which is an annular structure that serves multiple purposes. First, the azimuth table drive fixture 24 directly supports the azimuth table. Its lower, outer edge directly mates to the inner race of an azimuth table support bearing 26. The lower surface attaches directly to an azimuth shear web 25. Finally, the embodiment shown in FIG. 2 includes four capacitor probes 23 which are mounted to the azimuth table drive fixture 24 such that the spacing between the ends of the probes 23 and the reference surface 22 is approximately 0.002 inches. As may be readily appreciated, the number of capacitor probes 23 may vary; for example, six capacitor probes 23 may alternatively be employed thereby increasing the statistical accuracy of the measurement. However, a minimum of three capacitor probes 23 must be employed.

The azimuth table support bearing 26 is preferably an ABEC class 5 ball bearing. The inner diameter is 4.5 inches so as to provide the necessary clearance for the azimuth table drive fixture 24, which is approximately 4 inches in diameter. These dimensions are established by the reference plane 22 which is nominally 4 inches in diameter.

The azimuth shear web coupling flexure 25 is designed to minimize the side forces and twisting torques that would cause binding and distortion of the azimuth table 30 as a result of misalignment between the fixture 24 and the drive shaft 14. The flexure 25 consists of three major parts, a shear web and two center clamping hubs (not shown). The shear web is made of 0.005 inch thick stainless steel shim stock. Small holes on the periphery of the shear web are clearance holes for bolts that fasten the shear web to the drive fixture 24. Larger holes are provided as clearance holes for the capacitor probes 23. The hubs clamp the center of the shear web between them. The drive shaft 14 couples directly to the bottom hub. As a result of the spacing between the hubs and periphery where the shear web is clamped to the drive fixture 24, the flexure 25 is extremely compliant to angular misalignment, yet is extremely stiff to torques about the rotational axis.

Typically, misalignments are accounted for by utilizing a bellows between two shafts. The bellows is usually only slightly larger in diameter than the shafts being coupled and therefore must necessarily be stiff in bending if it is to be adequately stiff in rotation. By utilizing the concept of a shear web, the metrology system of the present invention takes advantage of the fact that stiffness to torques increases with the fourth power of the radius. In this manner extremely high stiffness to rotational forces is attained because of the large diameter of the shear web, yet the flexure is totally compliant to bending, therefore producing no unwanted side forces and torques. Two additional shear webs 33, 34 are associated with the elevation drive portion of the SLBD 52, and work on the save principle.

A detailed discussion of the reference plane is deferred to the section on beam pointing and stabilization.

Azimuth table and elevation drive

The azimuth table 30 is the component that is directly referenced to the metric structure 20 and becomes the intermediate reference for the rest of the system. The reference is transferred through the rigid elevation cylinder supports 40 and the elevation tilt reference/elevation encoder support 36. Rotation in the elevation axis is accomplished with an elevation cylinder 41 which rotates on three elevation cylinder support bearings 43 which are mounted in each of the supports 40. The top bearing in each support 40 is spring loaded to provide a preload against the other two bearings. If the inner bore of the bearings is one inch or less, then the total translational error of the elevation cylinder 41 can be kept to less than 0.0002 inches with ABEC class 5 bearings. The elevation cylinder 41 internally houses the optical bench and the beam projection optics (not shown) as well as azimuth and elevation Bragg cells 42. A cylindrical geometry for the elevation cylinder is chosen because this geometry combines rigidity with light weight. The elevation cylinder 41 is rotated by the elevation servo motor 31. The torque from the motor is transferred through a Rotolok 32 to the elevation cylinder 41 through the elevation servo drive shear web coupling fixture 33. Note that shear web coupling fixtures 33, 34 fasten directly to the elevation cylinder 41.

By using the Rotolok 32, a much smaller servo motor 31 can be used. The mass of the motor is substantially reduced, and, in addition, the motor can be placed under the elevation cylinder 41 in such a way as to minimize the moments of inertia about the azimuth axis. In so doing, the size of the azimuth drive motor 11 is reduced and the mechanical responsiveness of total azimuth drive system is increased.

An elevation encoder 35 is mounted to the elevation tilt reference/elevation encoder support 36 and is coupled to the elevation drive cylinder 41 through the elevation encoder shear web coupling fixture 34. This particular configuration requires a hole through an elevation tilt reference plane 37. An alternate configuration would be to mount the encoder 35 directly to the shaft of the servo drive motor 31. However, if this latter configuration is chosen, one can assume that the gearing through the Rotolok 32 is effectively perfect. The elevation tilt reference plane 37 mounts directly to the elevation tilt reference/elevation encoder support 36 and is identical to the corresponding azimuth reference plane 22. Six capacitor probes 38 are mounted directly to the elevation cylinder and should be adjusted for a gap of approximately 0.002 inches with respect to the surface of the elevation tilt reference plane 37.

Deem pointing and stabilization

The elements needed for beam pointing and stabilization are identical for both the azimuth and the elevation axes. Therefore, in the following description, no attempt will be made differentiate between the two axes, even though the embodiments for each axis may differ in some minor details.

Given that it is difficult, and therefore expensive, to construct a nearly perfect mechanically rotating device to point the beam over a large field of regard, such a device still would not have the necessary bandwidth to meet the DRMS requirements. An air bearing does approach that degree of perfection, but would not be capable of performing the high speed control and vibration rejection.

In describing the beam pointing and stabilization mechanism, recall that the necessary measurements have been made by the reference subsystem and the mathematical transformations have been made by the computational subsystem, so that the precise angle at which the stabilized laser beam must leave the SLBD 52 has been determined. The means for accomplishing this are described in the following sections.

The three elements that provide the beam pointing and stabilization are the (1) large angle drivers, (2) the high speed beam deflectors, and (3) axis tilt detectors.

Large angle driver

The large angle driver refers to the combination of the DC servo motor 11, the incremental encoder 12, and the azimuth table/elevation cylinder. It should be noted that incremental encoders normally do not provide information as to the absolute angular orientation of the encoder disk. Instead, there is defined a "home" position from which one starts counting zero crossing or pulses, depending on the designed electrical signal output of the encoder. In this embodiment, a sinusoidal electrical output is used and zero crossings counted. Thus, in practice, when the system is started up, the large angle driver would be commanded to the home position to establish its absolute orientation, and then zero crossings would be counted to determine angular displacement from the home position. The servo motor controller is actually commanded to move the motor a given number of zero crossings rather than through an angle. The controller also stores the current number of pulses displaced from the home position, so that it is not necessary to return to home every time a new angular position is desired. So once the desired angle is determined (which can happen several thousand times per second), the servo motor is commanded to rotate a certain number of zero crossings so as to mechanically move the whole assembly to point within the angular range of the high speed beam deflector Bragg cell 42.

A preferred encoder is a BEI model L25 incremental encoder with a sinusoidal quadrature output. This encoder is capable of dividing the circle into 10,160 increments to an accuracy of a fraction of a µradian. Therefore, the angular distance between each zero crossing is 618.4 µradians. Since the Bragg cell 42 is capable of deflecting the stabilized laser beam 56 over an angular range of 5 to 50 milliradians (depending on model), there is ample overlap between the range of the Bragg cell 42 and the steps of the encoder.

Once the desired zero crossing has been determined and the motor driven to that position, the controller tries to keep the large angle driver mechanical assembly in that position. In reality, no servo system can maintain an exact position, and the mechanism will be constantly oscillating about the zero crossing, as the control system hunts for the desired position. Since the output of the encoder is sinusoidal, it can be demonstrated through a Taylor series expansion of the sine function that the electrical output of the encoder will be a linear function of the angular error over some range of angular oscillation. A simple calculation will show that for an angular oscillation of ±15 µradians the error incurred by assuming a linear output with angle is less than 0.075 µradians. Thus, the error signal can be used to drive the Bragg cells 42 so as to correct for the mechanical pointing error.

The largest error from the encoder results from the fact that the two quadrature outputs are not exactly 90° apart. However this is a fixed bias which can be measured and then removed through calculation. In summary, the large angle driver positions the mechanical assembly within the angular range of the high speed beam deflectors, and provides a .time varying angular error signal to allow the position of the stabilized beam to be corrected for the large angle driver motion.

Axis tilt detector.

The principle of the axis tilt detector is pictorially illustrated in FIG. 5. As a preliminary matter, it should be noted that an optical flat 80 is typically polished to a flatness of one tenth to one twentieth of a wavelength of light. For use in the visible spectrum, the 0.63 µm line from a helium-neon laser is normally used as a reference wavelength. A four inch diameter optical flat is adequate for this application, with such optical flats being readily available as a catalog item. The flatness specification normally does not apply to the region near the edge, therefore the probes should not be placed too close to the edge. In general, the surface within a 1.75 in radius from the center will meet the flatness specification. If the optical flat 80 is coated with a thin layer of aluminum 82, it now has a conductive coating that can be used as one plate of a capacitor. When the flat is coated in this way, it is normally sold as a mirror.

The illustration in FIG. 5 shows three electrodes 84. If we consider the center of the bottom surface of each electrode as a defined point, then the three points define two intersecting straight lines, or vectors a and b. These, vectors in turn, define an electrode plane. By knowing the distance of each electrode 84 from the surface of the mirror, both the displacement of the electrode plane from the mirror surface and the precise orientation of the electrode plane with respect to the mirror can be determined. The orientation of the electrode plane is a direct measurement of the axis tilt. In the embodiment illustrated in FIG. 2, six electrodes 84 are used rather than three. This is done in order to increase the statistical precision of the measurement by increasing the number of independent measurements.

Figure 6:
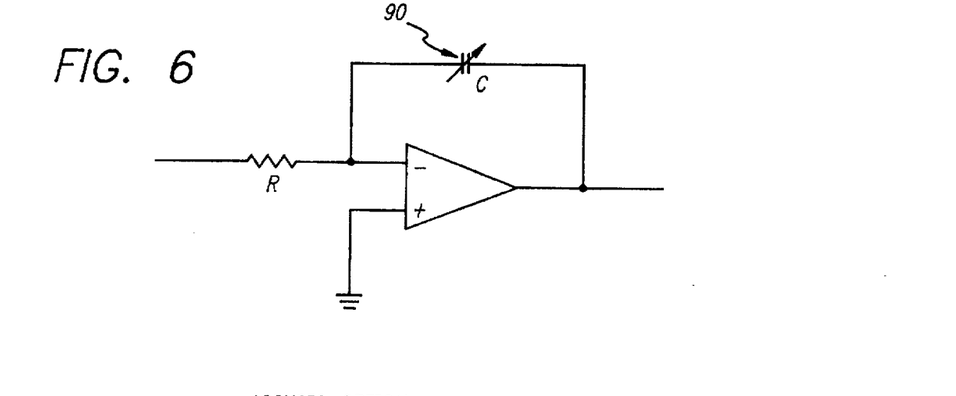
FIG. 6 is an electrical schematic of a circuit for measuring the distance between an electrode and a mirror surface.

The surface of each electrode 84 is a conducting surface, therefore the electrode surface and the mirror surface together form an electrical capacitor. The distance between electrode and mirror can be determined by measuring the electrical capacitance between the mirror 82 and the electrode 84. The capacitance between two conducting surfaces is given by the following equation:

$$C = \epsilon_0 \frac{A}{x} \quad (2.1)$$

where S.I. units are used and $\epsilon_0$ is the permitivity of free space and is equal to $8.854 \times 10^{-12}$ farads/meter, A is the area of the probe electrode and x is the distance between the electrode surface and the mirror surface. The preferred electrical circuit is shown in FIG. 6. The reason that a capacitor 90 is included in the operational amplifier feedback loop is that the amplifier output is a linear function of the spacing between the electrode 84 and the mirror 82 in this circuit configuration. The disadvantage of this circuit is that neither terminal of the capacitor can be grounded. Accordingly, precautions must be taken in construction to avoid unwanted electrical noise.

The following circuit parameters are preferred. An electrode diameter of 1 cm with an initial spacing of 0.002 inches between the electrode 84 and the mirror surface 82 should be employed. If the value of the resistance R is one kΩ and the frequency of the input voltage is 50 kHz at one volt, then this circuit would provide approximately a 40 millivolt change in output for a 0.1 µradian change in tilt angle.

Derivation of equations.

The three probes establish a plane. One probe is designated the origin, and two basis vectors are directed from the origin to each of the other two probes. The procedure for measuring tilt, or wobble, is to first establish a vector normal to the plane of the two basis vectors. At the same time, the distance of the probes from the reference plane is measured. These initial distances, which are of the order of 50 µm from the reference plane, establish the initial tilt angle with respect to the reference plane. All subsequent tilts due to the bearing wobble are reference to this initial tilt vector.

The three points directly below the center of the each probe are designated as the three points in the reference plane that establish the basis vectors in the reference plane. The basis vectors in the reference plane are designated as a and b, with the bold letters indicating a vector quantity. The scalar components of a and b are $[a_1, a_2, 0]$ and $[b_1, b_2, 0]$, respectively. Only vector operations are used to determine the angle of tilt and its direction. In this way, the result is independent of the coordinate system. Furthermore, there is no need for the basis vectors to be orthogonal to one another.

A vector c is established perpendicular to a and b by taking the cross product of a and b, thus c is equal to $$c = a \times b = [a_2 b_3 - a_3 b_2,\ a_3 b_1 - a_1 b_3,\ a_1 b_2 - a_2 b_1] \quad (2.2)$$

Since a and b are in the reference plane, they will have no component in the 3-direction, therefore $a_3 = b_3 = 0$, and $$c = [0,\ 0,\ a_1 b_2 - a_2 b_1] \quad (2.3)$$

Let $\delta a = [0, 0, \delta a_3]$ and $\delta b = [0, 0, \delta b_3]$, then the new tilted basis vectors are $$a' = a + \delta a \text{ and } b' = b + \delta b. \quad (2.4)$$

These establish a new normal c' given by $$c' = (a + \delta a) \times (b + \delta b) = a \times b + a \times \delta b + \delta a \times b + \delta a \times \delta b \quad (2.5)$$

Since $\delta a$ and $\delta b$ are parallel, their cross product is zero, therefore $$c' = (a + \delta a) \times (b + \delta b) = c + a \times \delta b + \delta a \times b \quad (2.6)$$

Equation (2.5) shows that c' is equal to the vector c and two components which are in the reference plane since $\delta a$ and $\delta b$ are perpendicular to the reference plane. These other two components are the projection of the vector c onto the reference plane caused by tilting c. Since a and b are of the order of 1 inch and $\delta a$ and $\delta b$ are of the order of 0.0001 inch or less, c' is approximately equal to c. The vectors $a \times \delta b$ and $\delta a \times b$ are the components of the vector in the reference plane giving the direction of tilt, and the angle of tilt is found by taking the magnitude of $(a \times \delta b + \delta a \times b)$ and dividing by the magnitude of c.

The proof of the above statements is as follows. The cross product between c and c' is $$\begin{aligned} c' \times c &= (c + a \times \delta b + \delta a \times b) \times c = (a \times \delta b) \times c - (b \times \delta a) \times c \quad (2.7)\\ &= (a \cdot c) \delta b - (\delta b \cdot c) a - (b \cdot c) \delta a + (\delta a \cdot c) b \end{aligned}$$

But c is perpendicular to both a and b, and since $\delta a = [0, 0, \delta a_3]$, $\delta b = [0, 0, \delta b_3]$, $$c' \times c = (\delta a \cdot c) b - (\delta b \cdot c) a \quad (2.8)$$

After some algebraic manipulation, the components of the cross product are given by $$c' \times c = (a_1 b_2 - a_2 b_1) [\delta a_3 b_1 - \delta b_3 a_1,\ \delta a_3 b_2 - \delta b_3 a_2] \quad (2.9)$$

Note that the vector given by Equation (2.9) is perpendicular to the direction of tilt. The angle of tilt is found by utilizing the following equation $$|c' \times c| = |c'||c| \sin \Theta \quad (2.10)$$

High Speed Beam Deflector

The high speed beam deflector consists of a pair of acousto-optic beam deflectors (Bragg cell) 42, one for each axis of rotation. In choosing the Bragg cell 42 for this application, it is necessary that the total angular deflection range produced by the Bragg cell 42 exceeds the angular increment between zero crossings of the encoder used in the large angle driver. For the Bragg cell 42 being considered in this example (Isomet 1205C2), the stabilized beam entering the Bragg cells can only be approximately 1 mm in diameter. If it is assumed that the light source is a laser diode with a wavelength of 0.85 μm and that this beam were to be focused at a point 8 m away (approximately the projection distance to reach the far edge of a 15 ft. cube) the focused spot diameter would be nearly 17 mm in diameter. A spot of this size would be larger that the photodetector on the tool sensor subsystem. In order to obtain a sufficiently small spot on the photodetector, the stabilized beam will have to be expanded to a diameter of 5 mm before being focused on to the tool sensor photodetector. This will result in a spot only 3 mm in diameter on the detector surface.

Since beam expansion is necessary to obtain a small focal spot on the tool sensor 60, the additional effects of the beam expander on the system design must be considered. A schematic of the stabilized beam leaving the acousto-optical detector and propagating through a beam expander and focusing lens is shown in FIG. 7. Note that the stabilized beam leaves the Bragg cell at some angle from the center line. After the beam passes through the beam expander, the deflection angle is reduced. The angle of deflection is reduced by the amount the beam has been expanded. The system effects are as follows.

There is limitation as to the maximum amount the beam can be expanded that is governed by the angular distance between encoder transitions, $\Delta\Theta_c$, and the total deflection angle of the stabilized beam 56. The terms input space angle $\Theta_i$ and output space angle $\Theta_o$ are referenced to the beam expander and the large angle driver. Output space refers to the angle measured in the workpiece fixed coordinate system. The angular changes produced by the large angle driver and the beam leaving the beam expander are in output space. The angular changes produced by the output of the Bragg cell 42 are in input space. If $\Delta\Theta_i$ is angular change in input space and $\Delta\Theta_o$ is the angular change in output space then $\Delta\Theta_i/\Delta\Theta_o$ is equal to the beam expansion ratio BR. Since $\Delta\Theta_o$ must always be larger than $\Delta\Theta_c$, and $\Delta\Theta_o$ is fixed by the design of the Bragg cell 42, there is a limit to how large BR can be.

The frequency range over which the Bragg cell operates is 65 MHz to 95 MHz. In order to maintain a given angular accuracy, $\Delta\Theta$, it is necessary to maintain a given frequency accuracy, $\Delta f$. The relationship between the two is $$\Delta\theta = \frac{\lambda}{v} \Delta f \qquad (2.11)$$

where λ is the wavelength of the light beam going through the Bragg cell (0.85 μm) and v is the velocity of sound in the Bragg cell medium (3630 m/sec). Equation (2.11) shows that if the angular accuracy is to be controlled to 0.1 μradians, the frequency must be controlled to within 427 Hz. Such precise control at a frequency of nearly 100 MHz is possible, but reduces the control bandwidth. Expanding the beam helps, since $\Delta f$ can be increased by the ratio BR, thereby making it easier to obtain the needed bandwidth.

Figure 4:
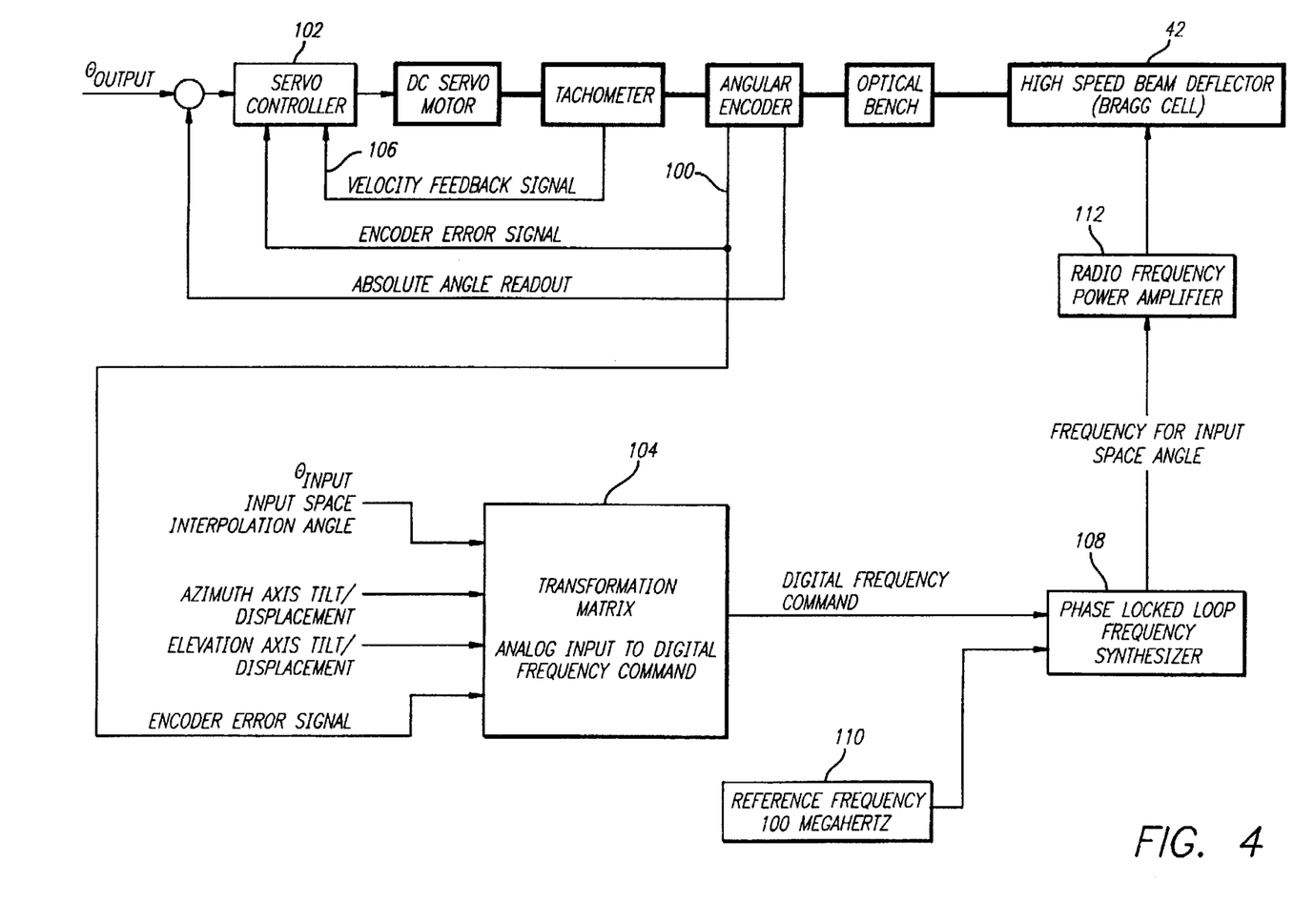
FIG. 4 details the control of a single axis of the stabilized beam director of the present invention.

The system interaction between the mechanical components of the SLBD 52 and the electrical signals is shown in FIG. 4. Only the azimuth angle control is shown since the analogous elevation control system is similar. The angle $\Theta_{input}$ is generated by the Computational Subsystem and is calculated by signals derived from the Reference Subsystem and user input such as a CAD drawing or direct command. In addition to $\Theta_{output}$, the output of a coarse, absolute encoder may also be provided as feedback to confirm that counts were not dropped from the incremental encoder. This loop is not necessary for the functioning of the invention, but it is a good error check. The encoder error signal at line 100 is fed back to both a servo controller board 102 and to a transformation matrix processor 104. The transformation matrix processor 104, for example, could be an appropriately programmed workstation of a signal processor such as the Motorola DSP56000. In order to have a stable control loop, it is necessary to also provide velocity feedback to the servo controller. A velocity signal at line 106 can be generated by adding a tachometer to the system or by mathematically differentiating encoder error signal.

In addition to the encoder error signal, both the elevation and the azimuth axis tilt measurements as well as the displacement measurements from the tilt detectors have to be fed into the transformation matrix, and finally the input space interpolation angle that positions the beam between encoder transitions has to be provided.

The output of the transformation matrix 104 is preferably a digital frequency command to a phase locked loop frequency synthesizer 108. A commercially available device for generating the necessary frequencies from a digital input is the Phillips TSA6057 frequency synthesizer. The synthesizer also requires a reference frequency input. The frequency stability needed to assure deflection of the Bragg cell 42 to the necessary angular accuracy is one part in one million. A frequency source 110 capable of providing that level of stability is a Hewlett Packard HP 10811 oscillator. This oscillator further serves as the timing reference for the overall DRMS system. The output of the frequency synthesizer 108 is amplified by a radio frequency power amplifier 112 in order to provide a power level of one watt to drive the 50 ohm load of the Bragg cell 42.

WORKPIECE REFERENCE SUBSYSTEM

The Workpiece Reference Subsystem consists of a minimum of three reference detector assemblies rigidly mounted on the workpiece, or on a jig holding the workpiece. The purpose of the reference detector assemblies is to establish the locally rigid reference plane on the workpiece, and to measure the relative motion of the SLBDs 52 with respect to the workpiece. The precise positioning of the reference detectors can be determined by (1) direct measurement, (2) fiducials built into the workpiece or the jig, (3) by utilizing the Calibration Subsystem.

Each reference detector assembly contains one or more photodetectors that is capable of measuring the position of the centroid of the reference beam to an accuracy of a few tens of microinches. In general, a single photodetector would be adequate for each reference detector assembly. In that case, each reference beam 54 would time share the use of the reference detector 58 by controlling the on and off time of each laser. However, geometrical constraints imposed by the nature of the workpiece could require the use of more than one photodetector in each assembly. As may be readily appreciated, the detailed mechanical design of the reference detector assembly is highly dependent on the particular configuration of the workpiece and may vary accordingly.

There are several classes of photodetectors that could be used to measure the beam position. CCD arrays and quad cells are two commonly-used photodetectors which could be used in some limited circumstances, but are generally not recommended. The preferred class of photodetector is the lateral effect photodiode which can continuously measure the position of the light beam centroid to a resolution of 12 microinches over a 13 mm by 13 mm square. The lateral-effect photodiode has a frequency bandwidth of greater than 100 kHz, which is more than adequate for this application. A recommended photodetector is the Hammamatsu S1300 Duo-Lateral Position-Sensitive Detector.

Beam position measurement

Electrical circuitry and mathematical operations associated with the lateral effect photodiode are readily available and typically discussed in literature provided by manufacturers.

TOOL SENSOR SUBSYSTEM

The Tool Sensor Subsystem is similar in concept to the reference detector assembly. In fact, there may be very little difference between the two either mechanically or electrically. In many applications, two detectors would be required on the sensor assembly. This would permit the two laser beams to establish a reference plane from which the orientation of the tool could also be measured.

The function of tool sensor is to measure the position of the stabilized laser beams on the sensor and use this information in one of two ways. The first is as a positional error measuring device. In this mode, the SLBD beams establish the desired point in space and the tool sensor 60 measures the deviation from this position. This error is used as the basis of commands to the tool to correct the error.

The second way in which the tool sensor 60 could be used is to provide error signals to the SLBDS 52. This would allow the SLBDs 52 to track the sensor, and in this way determine the position of the sensor at all times.

In this mode, the DRMS 50 can be used to measure the as built configuration of the workpiece.

CALIBRATION SUBSYSTEM

The calibration subsystem provides the means of initially setting up the DRMS system in the work place, periodically checking the operation of the system, and making the DRMS metrology traceable to the National Institute of Standards and Technology. The Calibration subsystem consists of a specially built calibration fixture with its associated detectors and electronics.

The calibration fixture consists of a tetrahedron built from a material that is mechanically stiff and thermally stable such as invar or carbon/epoxy. The tetrahedron is the only geometrically rigid figure in space, and was chosen for this reason. At each vertex of the tetrahedron is placed a photodetector similar to the reference detector. The positions of the photodetectors are very accurately measured, and these measurements could be made traceable to NIST length standards. The length of each edge of the tetrahedron should be between one and two meters long for most applications.

The distances that are measured on the tetrahedron are the distance between each of the optical centers of the four photodetectors placed at the vertices. The point defining the optical center on the surface of each photodetector is defined as a vertex of the tetrahedron. The error associated with these measurements should be maintained to less than 0.5 μm (20 microinches). This level of accuracy can be obtained with a commercially available instrument such as the Hewlett-Packard model 5527B laser interferometer positioning system and its accessories. Note that the assembly of the tetrahedron does not require this level of accuracy, since the actual positions of the photodetector optical centers are measured after assembly. It is required that the structure holding the detectors be highly stable dimensionally. Note that the lines connecting the vertices are not necessarily coincident with the mechanical structure.

Figure 8:
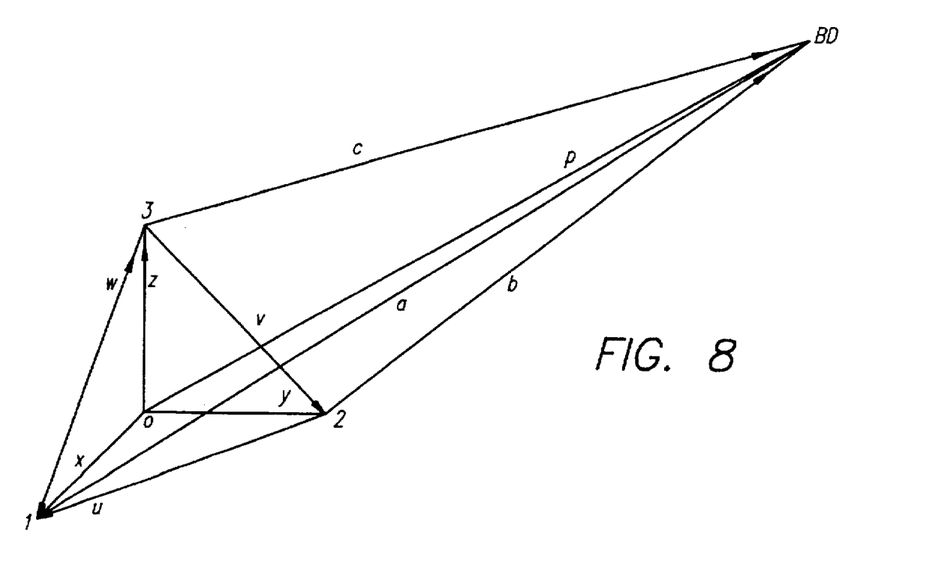
FIG. 8 illustrates a vector analog of a tetrahedron of a calibration subsystem.

The tetrahedron is shown in FIG. 8 as a vector analog; i.e., the directed lines between the vertices, and the directed lines between the vertices and one of the beam directors as indicated by BD in the figure. The edges of the calibration tetrahedron are shown as the lines between the vertices labeled as 0, 1, 2, and 3. The six edges of the tetrahedron are labeled as x, y, z and u, v, w. The vectors coinciding with these edges are as follows:

x is directed from 0 to 1 y is directed from 0 to 2 z is directed from 0 to 3 u is directed from 2 to 1 v is directed from 3 to 2 w is directed from 1 to 3

The vectors from the vertices to the beam director are designated as p, a, b, and c.

The four surfaces of the tetrahedron consist of four triangles with twelve interior angles. Since all six of the sides making up the four triangles are known, then the twelve interior angles can be calculated (Ref.: R. S. Burington, "Handbook of Mathematical Tables and Formulas, 3rd ed.", paragraph 65. Handbook Publishers, Inc., Sandusky, Ohio). We now use the three vectors x, y, and z to form the basis vectors of a three dimensional coordinate system. Note that these three vectors need not be orthogonal to each other, thus they could form an oblique coordinate system. In that case the covariant and the contravarient components of the vectors must be differentiated (Ref.: E. A. Guillemin, "The Mathematics of Circuit Analysis", Chap. 3. John Wiley and Sons, Inc., New York). At the vertex BD, six angles can be measured between the four vectors p, a, b, and c by directing the stabilized beam to the vertices 0, 1, 2, and 3. This is sufficient to calculate the length of the vector p and its components along the x, y, and z axes.

In order that the equations to be derived are independent of the coordinate system, they will first be written out in vectorial form. At the tetrahedron we have:

$$u = x - y \tag{2.12}$$

$$v = y - z \tag{2.13}$$

$$w = z - x \tag{2.14}$$

Additionally:

$$x = p - a \tag{2.15}$$

$$y = p - b \tag{2.16}$$

$$z = p - c \tag{2.17}$$

$$u = b - a \tag{2.18}$$

$$v = c - b \tag{2.19}$$

$$w = a - c \tag{2.20}$$

All the vectors on the left hand side of equations 2.15 through 2.20 are known. In order to solve for the four unknown vectors, only four of the above equations are chosen. For purpose of illustration, equations 2.15 through 2.18 are selected. An angle between two vectors, such as that between vectors p and c, is indicated by the notation ∠pc. Next, the vector operation of a dot product is taken on each of the equations. By taking the dot product (also referred to as the scalar product and the inner product), the results are independent of the nature of the coordinate system. The resulting equations are as follows:

$$x \cdot x = (p-a) \cdot (p-a) = p \cdot p + a \cdot a - 2a \cdot p \tag{2.21}$$

$$y \cdot y = (p-b) \cdot (p-b) = p \cdot p + b \cdot b - 2b \cdot p \quad (2.22)$$

$$z \cdot z = (p-c) \cdot p - c) = p \cdot p + c \cdot c - 2c \cdot p \quad (2.23)$$

$$u \cdot u = (b-a) \cdot (b-a) = a \cdot a + b \cdot b - 2a \cdot b \quad (2.24)$$

Note that the quantities in equations 2.21 through 2.24 are now scalars due to the mathematical operation of the dot product. The magnitude of a vector will be represented by italics; i.e., $x=|x|$, etc. Accordingly, equations 2.21 through 2.24 are written in terms of the corresponding scalar quantities as follows:

$$x^2 = p^2 + a^2 - 2ap \cos(\angle ap) \quad (2.21a)$$

$$y^2 = p^2 + b^2 - 2bp \cos(\angle bp) \quad (2.22a)$$

$$z^2 = p^2 + c^2 - 2cp \cos(\angle cp) \quad (2.23a)$$

$$u^2 = a^2 + b^2 - 2ab \cos(\angle ab) \quad (2.24a)$$

The left hand side of these equations as well as the angles are measured quantities. Equations 2.21 a through 2.24a make up a set of four nonlinear equations in four unknowns. These equations are best solved utilizing an algorithm based on the Newton-Raphson method (Ref: W. H. Press, B. P. Flannery, S. A. Teukolsky, and W. T. Vetterling; "Numerical Recipes, the Art of Scientific Computing", Chap. 9. Cambridge University Press, 1986). As described in the literature, nonlinear equations can have more than one set of solutions, therefore precautions should be taken to assure convergence to the correct solution in this application.

The components of p along the vectors x, y, and z can now be calculated using the formulas of plane trigonometry. In a similar manner, the vector p' to the second beam director can be determined. The baseline between the two beam directors is now given by the vector p–p'. With the baseline known, it is now possible to determine the position of any other point in space.

By sequentially bringing the stabilized beams 56 of each SLBD 52 on to the photodetectors, the exact positions and orientations of the SLBDs 52 can be measured by a surveying process known as tacheometry. Once the positions of the SLBDs 52 are known as well as their positions with respect to the reference detectors 54, the system is ready to perform its metrology function.

COMPUTATIONAL SUBSYSTEM

The high bandwidth requirements of the DRMS 50 make it a computationally intensive system. The large number of signals consisting of both external measurements and internal corrections require a powerful workstation to carry out the necessary computations. An alternative approach is to take advantage of a distributed computational system utilizing special purpose components such as digital signal processors. Such processors could be imbedded in each individual subsystem and communications to a executive central processor could be digitally implemented over fiber optic links. Such an approach provides immunity from severe electrical noise sources that are likely to be present on the factory floor. In a distributed computational system, the executive central processor may be a high end personal computer. The most difficult mathematical operations are the coordinate transformations needed to bring all measurements to the workpiece coordinate system. These transformations are available as commercial software in packages such as PV-WAVE by Visual Numerics, Inc.

What is claimed is:

1. A high-bandwidth, dynamically rigid metrology system for providing real time control of an optical steering element, the system comprising:

a pair of stabilized laser beam directors (SLBD) each including a base, a beam pointing and stabilization apparatus mechanically coupled to said base, three reference beam lasers and a stabilized beam laser attached to said base and a metric structure mechanically coupled to said SLBD providing a locally rigid SLBD coordinate system, each beam pointing and stabilization apparatus including an optical steering element and an axis tilt detector, said optical steering element being optically coupled to said stabilized beam laser and steering said stabilized beam laser in response to an input signal, said optical steering element providing error signals associated with a position and an orientation of said optical steering element relative to said locally rigid SLBD coordinate system, said optical steering element further including a rotational axis, said axis tilt detector providing signals indicating an angle of tilt and a direction of said rotational axis relative to an initial position of said rotational axis;

a reference subsystem including three reference detectors fixedly positioned relative to a workpiece providing a locally rigid workpiece coordinate system, said three reference detectors respectively being in optical communication with said three reference beam lasers of each said SLBD, said reference detectors generating reference detector output signals in response to said reference beam lasers;

a tool sensor subsystem including at least one tool sensor detector positioned on a tool and in optical communication with said stabilized beam laser, said at least one tool sensor detector generating tool sensor detector output signals in response to said stabilized beam laser; and at least one processor receiving and performing coordinate transforms on the reference detector output signals and the tool sensor detector output signals to track a position of the tool relative to the locally rigid workpiece coordinate system, said at least one processor receiving and processing the angle of tilt and direction signals from said axis tilt detector and the error signals from said optical steering element to generate said input signal thereby providing real time control of said optical steering element.

2. The high-bandwidth, dynamically rigid metrology system of claim 1 wherein said stabilized beam laser comprises a single mode laser.

3. The high-bandwidth, dynamically rigid metrology system of claim 1 wherein said optical steering element comprises:

a large angle driver controlling an orientation of said beam pointing and stabilizing apparatus relative to said base and generating the error signals; and a high-speed beam deflector optically coupled to said stabilized beam laser and steering said stabilized beam laser in response to the input signal.

4. The high-bandwidth, dynamically rigid metrology system of claim 3 wherein said large angle driver includes at least one encoder generating the error signals.

5. The high-bandwidth, dynamically rigid metrology system of claim 3 wherein said high-speed beam deflector comprises an acousto-optic beam deflector optically coupled to and steering said stabilized beam laser in response to the input signal.

6. The high-bandwidth, dynamically rigid metrology system of claim 3 wherein said high-speed beam deflector comprises:

a beam expander optically coupled to said stabilized beam laser and outputting an expanded stabilized beam; and an acousto-optic beam deflector receiving and steering the expanded stabilized beam in response to the input signal.

7. The high-bandwidth, dynamically rigid metrology system of claim 1 wherein said axis tilt detector comprises:

a substantially planar conductive surface fixedly positioned relative to a reference plane of said beam pointing and stabilization apparatus; and an electrode plane comprising at least three electrodes fixedly positioned relative to said rotational axis, capacitances between said conductive surface and said at least three electrodes facilitating a measurement of the angle of tilt and direction signals.

8. The high-bandwidth, dynamically rigid metrology system of claim 7 wherein said conductive surface comprises an optical flat.

9. A control system for an optical steering element in a high-bandwidth dynamically rigid metrology system, the system comprising:

a pair of stabilized laser beam directors (SLBD) each within a locally rigid SLBD coordinate system, each of said SLBDs including an optical steering element and an axis tilt detector, each of said optical steering elements steering a stabilized beam laser in response to an input signal, said optical steering elements of each SLBD including a rotational axis and outputting error signals associated with a position and orientation of said optical steering element relative to said locally rigid SLBD coordinate system, said axis tilt detector of each SLBD providing signals indicating an angle of tilt and a direction of said rotational axis relative to an initial position of said rotational axis; and a reference subsystem providing a locally rigid workpiece coordinate system and outputting signals indicating positions of said SLBDs relative to said reference subsystem; and a processor processing the signals from said reference subsystem relating said locally rigid SLBD coordinate systems to each other and to said locally rigid workpiece coordinate system and processing the error signals and the angle of tilt and direction signals to generate the input signal to steer the stabilized beam laser in real time.

10. The high-bandwidth, dynamically rigid metrology system of claim 9 wherein said stabilized beam laser generates a circular and collimated outgoing beam.

11. The high-bandwidth, dynamically rigid metrology system of claim 9 wherein said optical steering element comprises:

a large angle driver controlling coarse movements of said optical steering element and generating the error signals; and a high-speed beam deflector optically coupled to said stabilized beam laser and controlling fine steering of said stabilized beam laser in response to the input signal.

12. The high-bandwidth, dynamically rigid metrology system of claim 11 wherein said large angle driver includes two encoders generating the error signals.

13. The high-bandwidth, dynamically rigid metrology system of claim 11 wherein said high-speed beam deflector comprises a Bragg cell optically coupled to and steering said stabilized beam laser in response to the input signal.

14. The high-bandwidth, dynamically rigid metrology system of claim 11 wherein said high-speed beam deflector comprises:

a beam expander optically coupled to said stabilized beam laser and outputting an expanded stabilized beam; and a Bragg cell receiving and steering the expanded stabilized beam in response to the input signal.

15. The high-bandwidth, dynamically rigid metrology system of claim 9 wherein said axis tilt detector comprises:

a substantially planar conductive surface fixedly positioned relative to a reference plane of said SLBD; and at least three electrodes fixedly positioned relative to said rotational axis, capacitances between said conductive surface and said at least three electrodes facilitating a measurement of the angle of tilt and direction signals.

16. The high-bandwidth, dynamically rigid metrology system of claim 15 wherein said conductive surface comprises an optical flat.

17. A dynamically rigid metrology system comprising:

a work-piece reference subsystem including a work-piece and at least three fixed broad area laser beam sensors fixedly mounted on the work-piece;

a tool sensor reference subsystem including a controlled tool for interfacing with the work-piece, a mechanism for controlling the position of the controlled tool and a broad area laser beam sensor mounted on the tool adjacent to a point of interaction of the tool with the work-piece;

two spaced stabilized laser beam directors (SLBD), each said SLBD directing a laser beam at each of the fixed broad area laser beam sensors, and each said SLBD also directing a tracking laser beam at the broad area laser beam sensor on the tool; and a computational subsystem;

said work-piece reference system being adapted to employ the laser beams at each of the fixed broad area laser beam sensors to measure motions of the SLBDs relative to the work-piece;

said computational subsystem being adapted to employ data indicating the motions of the SLBDs relative to the work-piece to provide a functional equivalent of a globally rigid system between locally rigid reference sites at the work-piece and the SLBDs.

18. A system as defined in claim 17 wherein said tool reference subsystem is further adapted to measure positions of the tracking lasers on the sensors on the tool to generate error signals.

19. A system as defined in claim 17 wherein each said SLBD includes a high speed laser beam director for shifting the orientation of said tracking laser beams to track the movement of the tool.

20. A system as defined in claim 17, further comprising circuitry for controlling the position of said tool in accordance with signals received from said fixed and said tracking broad area laser beam sensors.

* * * * *